United States Patent [19]

Curtis

[11] Patent Number: 5,175,903
[45] Date of Patent: Jan. 5, 1993

[54] DRIVE CONNECTION FOR THE ARM OF A WINDSCREEN WIPER

[75] Inventor: Martyn Curtis, London, England

[73] Assignee: Trico Products Corporation, Buffalo, N.Y.

[21] Appl. No.: 419,225

[22] Filed: Oct. 10, 1989

[30] Foreign Application Priority Data

Oct. 12, 1988 [GB] United Kingdom ............... 8823888

[51] Int. Cl.⁵ ............................ B60S 1/34; B60S 1/04
[52] U.S. Cl. ............................ 15/250.34; 19/250.13; 403/243; 403/293; 174/138 D; 174/138.12; 174/152 R
[58] Field of Search ........... 15/250.34, 250.31, 250.35, 15/250 R; 174/138 D, 138 R, 152 R, 153 G; 403/243, 253; 343/713

[56] References Cited

U.S. PATENT DOCUMENTS

| | | | |
|---|---|---|---|
| 2,892,503 | 6/1959 | Hood, Jr. et al. | 174/138 R |
| 3,033,624 | 5/1962 | Biesecker | 174/153 G |
| 3,085,821 | 4/1963 | Ryck | 15/250.34 |
| 3,193,335 | 7/1965 | Wing | 174/153 G |
| 4,564,971 | 1/1986 | Pethers et al. | 15/250.35 |
| 4,685,467 | 8/1987 | Cartmell et al. | 128/640 |
| 4,716,617 | 1/1988 | Noack et al. | 15/250.34 |
| 4,856,137 | 8/1989 | Palû | 15/250.31 |

FOREIGN PATENT DOCUMENTS 2156648 7/1956 Fed. Rep. of Germany ... 174/138 D

Primary Examiner—Harvey C. Hornsby
Assistant Examiner—Gary Graham
Attorney, Agent, or Firm—Joseph G. Nauman

[57] ABSTRACT

A drive connection for the arm (2) of a windscreen wiper comprises a metallic wiper arm (2), a spindle (5) by which it is driven and means (7) for electrically insulating the wiper arm (2) from the spindle (5), thus electrically isolating the arm (2) and blade of the wiper from the rest of the vehicle.

3 Claims, 1 Drawing Sheet

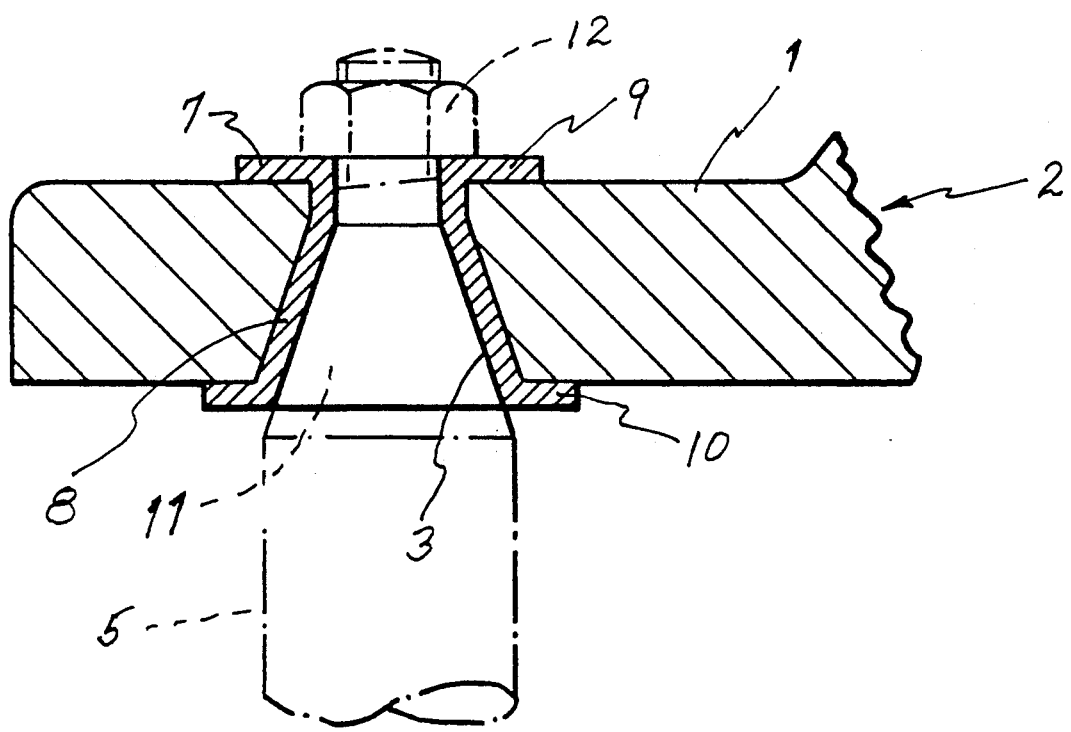

DRIVE CONNECTION FOR THE ARM OF A WINDSCREEN WIPER

This invention relates to a drive connection for the arm of a windscreen wiper.

BACKGROUND OF THE INVENTION

Nowadays most cars are fitted with radio equipment, either by the manufacturer as original equipment or by the purchaser. In order for this equipment to operate, it is necessary to provide some sort of aerial. With modern trends in vandalism, the older fashioned aerials which were either permanently extended or which were left extended due to the difficulty of telescoping them were prime targets for destruction.

The more expensive cars have for a long time been fitted with electrically operated aerials and these are not readily damaged. Modern proposals for cheaper cars have included the idea of incorporating the aerial into the wiring for the rear screen heater. This has proved successful but has suffered disadvantages where a rear screen wash/wipe system has been installed due to the fact that the operation of the rear screen wiper has caused interference to the radio signal being received.

The present invention seeks to substantially reduce or obviate the interference caused by the operation of a rear screen wiper.

SUMMARY OF THE INVENTION

According to the invention, there is provided a drive connection for the arm of a windscreen wiper comprising a metallic wiper arm, a spindle by which it is driven and means for electrically insulating the wiper arm from the spindle, thus electrically isolating the arm and blade of the wiper from the rest of the vehicle.

Surprisingly, it has been found that this expedient removes at least most of the interference otherwise generated.

Preferably the head of the wiper arm for attachment to the drive spindle is apertured to receive the spindle, the aperture having a plastics insulating bush so arranged as to prevent any contact between the spindle and the head itself.

The bush may have flanges extending outwardly on one or both sides of the aperture to prevent engagement of the arm head with the nut by means of which it is secured to the spindle and/or any other part of the vehicle.

Suitably, the aperture in the arm head, which may be tapered to correspond to the shape of the spindle end, may be splined on its interior surface to facilitate a better engagement between the plastics of the bush and the metal of the arm head.

DESCRIPTION OF THE PREFERRED EMBODIMENT

The invention will now be described in greater detail, by way of example, with reference to the drawing, the single FIGURE of which is a schematic cross section through the head of a windscreen wiper arm, the head being fitted with one form of bushing in accordance with an embodiment of the invention.

Referring to the drawing, the head 1 of a windscreen wiper arm 2 has a frusto-conical aperture 3 intended for seating on the end of a drive spindle for the windscreen wiper and indicated on the drawing by the chain line 5.

Within this aperture 3 is located a plastics bushing 7 which provides fore electrical insulation between the arm head 1 and the drive spindle 5, to this end, it has a frusto-conical part 8 which lies within the aperture 3 and two flanges 9 and 10, one at each end, which seat around the exterior of the arm head 1. Thus the frusto-conical part 8 provides insulation between the arm head 1 and the frusto-conical part 11 of the drive spindle 5 while the flange 9 provides insulation between the arm head 1 and the drive spindle nut 12 and the flange 10 provides additional insulation between the arm head 1 and any other part of the vehicle.

Suitably the inside of the aperture 3 is splined to provide an improved connection between the metal of the arm head 1 with the plastics material of the bushing 7. The bushing 7 may be a separately moulded element which is forced into the aperture 3 or it may be moulded directly into the head 1.

Tests have shown that, surprisingly, the electrical isolation of the wiper arm and blade from the rest of the vehicle, reduces, to a considerable extent, the interference generated by the wiper system when in action.

It will be appreciated that various modifications or alterations may be made to the above described embodiment without departing from the scope of the invention. For example, one or both of the flanges 9 and 10 could be replaced by plastics washers, making it easier to insert the bushing 7 into the aperture 3 in the arm head 1. The flange 9 could be omitted altogether where a catch arrangement is used for attaching the arm to the spindle instead of the nut 12. Also, the interior of the bushing 7 could be splined or otherwise shaped to ensure rotation of the arm with the drive spindle.

While the form of apparatus herein described constitute a preferred embodiment of this invention, it is to be understood that the invention is not limited to this precise form of apparatus, and that changes may be made therein without departing from the scope of the invention which is defined in the appended claims.

What is claimed is:

1. A drive connection for a windscreen wiper which acts against a windscreen in a vehicle, the windscreen incorporating a radio aerial, a metal wiper arm having a drive end and means defining a drive aperture in said drive end of said arm, a metal drive spindle supported on the vehicle and adapted to be reversibly rotated, said spindle having a drive output end shaped to fit in said drive aperture of said arm, and a retainer attachable to said drive output end to secure said wiper arm on said spindle; the improvement comprising an electrically insulating bushing fitted into said drive aperture and around said drive output end of said drive spindle providing an electrically insulated torque transmitting connection from said spindle to said arm.

2. A drive connection for a wiper arm as defined in claim 1, said bushing including at least one flange extending radially outwardly from an edge of said drive aperture so as to lie between said retainer and said wiper arm.

3. A drive connection for a wiper arm as defined in claim 1, wherein said drive output end of said spindle, said bushing, and said drive aperture in said arm are all correspondingly tapered.

* * * * *